US010196930B2

United States Patent
Suciu et al.

(10) Patent No.: US 10,196,930 B2
(45) Date of Patent: Feb. 5, 2019

(54) SYSTEM AND METHOD FOR CONTROLLING AN ENVIRONMENTAL CONDITION OF AN ENGINE ELECTRONIC COMPONENT

(71) Applicant: United Technologies Corporation, Farmington, CT (US)

(72) Inventors: Gabriel L. Suciu, Glastonbury, CT (US); Kurt J. Sobanski, Glastonbury, CT (US); Wesley K. Lord, South Glastonbury, CT (US); William K. Ackermann, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 572 days.

(21) Appl. No.: 14/974,808

(22) Filed: Dec. 18, 2015

(65) Prior Publication Data

US 2016/0177781 A1 Jun. 23, 2016

Related U.S. Application Data

(60) Provisional application No. 62/093,603, filed on Dec. 18, 2014.

(51) Int. Cl.
*F01D 25/10* (2006.01)
*F01D 25/12* (2006.01)
(Continued)

(52) U.S. Cl.
CPC ............. *F01D 25/10* (2013.01); *F01D 25/12* (2013.01); *F02C 3/04* (2013.01); *F02C 7/18* (2013.01);
(Continued)

(58) Field of Classification Search
CPC .. F01D 25/10; F01D 25/12; F02C 3/04; F02C 7/18; F02C 7/32; F02K 3/115; Y02T 50/675; Y02T 50/671; F05D 2260/202
See application file for complete search history.

(56) References Cited

U.S. PATENT DOCUMENTS

| 4,351,150 A | * | 9/1982 | Schulze | F01D 17/085 60/226.1 |
| 4,504,030 A | * | 3/1985 | Kniat | H05K 7/20136 244/117 A |

(Continued)

FOREIGN PATENT DOCUMENTS

| EP | 1610606 A1 | 12/2005 |
| FR | 2955897 A1 | 8/2011 |

OTHER PUBLICATIONS

English Abstract for FR2955897A1—Aug. 5, 2011; 1 pg.
European Search Report for Application No. 15201194.6-1607; dated May 17, 2016; 8 pgs.

*Primary Examiner* — Eldon Brockman
(74) *Attorney, Agent, or Firm* — Cantor Colburn LLP (57) ABSTRACT

The present disclosure relates generally to a gas turbine engine that includes a fan configured to generate a fanstream and a fanstream duct configured to receive the fanstream flowing therethrough. An engine electronic component is positioned in flow communication with the fanstream. A heating element is positioned in the fanstream upstream from the engine electronic component and is operative to heat at least a portion of the fanstream in flow communication with the engine electronic component. The position of the engine electronic component passively thermally conditions the engine electronic component and the heating element actively thermally conditions the engine electronic component.

20 Claims, 8 Drawing Sheets

(51) Int. Cl.
*F02K 3/115* (2006.01)
*F02C 7/18* (2006.01)
*F02C 7/32* (2006.01)
*F02C 3/04* (2006.01)

(52) U.S. Cl.
CPC ............... *F02C 7/32* (2013.01); *F02K 3/115* (2013.01); *F05D 2260/202* (2013.01); *Y02T 50/671* (2013.01); *Y02T 50/675* (2013.01)

(56) References Cited

U.S. PATENT DOCUMENTS

| | | | | |
|---|---|---|---|---|
| 4,674,704 | A * | 6/1987 | Altoz | H05K 7/20136 244/1 R |
| 6,481,211 | B1 * | 11/2002 | Haas | F01D 25/08 60/782 |
| 7,448,219 | B2 * | 11/2008 | Bowers | F01D 25/12 137/520 |
| 7,755,512 | B2 | 7/2010 | Ziarno | |
| 9,456,472 | B2 * | 9/2016 | Dalton | F02C 7/12 |
| 9,713,202 | B2 * | 7/2017 | Broughton | F02C 7/12 |
| 9,814,101 | B2 * | 11/2017 | Broughton | F02C 7/12 |
| 2005/0150204 | A1 * | 7/2005 | Stretton | F02C 7/047 60/39.83 |
| 2011/0120075 | A1 | 5/2011 | Diaz et al. | |
| 2013/0160460 | A1 * | 6/2013 | Dalton | F02C 7/12 60/796 |
| 2013/0160462 | A1 * | 6/2013 | Broughton | F02C 7/12 60/796 |
| 2013/0258583 | A1 | 10/2013 | Balk et al. | |
| 2014/0165531 | A1 * | 6/2014 | Broughton | F02C 7/12 60/39.093 |

* cited by examiner

SYSTEM AND METHOD FOR CONTROLLING AN ENVIRONMENTAL CONDITION OF AN ENGINE ELECTRONIC COMPONENT

CROSS REFERENCE TO RELATED APPLICATIONS

This application claims the benefit of U.S. Provisional Patent Application Ser. No. 62/093,603 filed Dec. 18, 2014, the entire contents of which are incorporated herein by reference thereto.

TECHNICAL FIELD OF THE DISCLOSED EMBODIMENTS

The present disclosure is generally related to gas turbine engines and, more specifically, to a system and method for controlling a temperature of an engine electronic component.

BACKGROUND OF THE DISCLOSED EMBODIMENTS

Generally, commercial engine electronic control (EEC) and Diagnostic, Prognostic and Health Monitoring (DPHM) components experience temperatures that may vary over a wide range. For example, at a typical 35,000 feet (10668 meters) altitude, the ambient temperature will likely be approximately −65° F. On a hot day, the ambient temperature plus solar radiative heat may be approximately 190° F. at sea level static conditions. Military EECs can see even hotter temperatures due to ram air inlet conditions during flight. There are two damaging aspects of the varying thermal environment. The first damaging aspect is the temperature cycles between extreme cold ambient air temperatures and high temperatures caused by ambient conditions coupled with internal heating effects. These thermal cycles stress internal components and solder joints because of differences in their respective thermal expansion coefficients. The cycles happen during every engine flight. The second damaging aspect is that the extreme hot ambient air temperatures over extended periods along with internally generated heat can degrade electronics and eventually cause loss of wire bonding, or other solder joints in integrated circuits. This can cause integrated circuits to malfunction at extreme high or low temperatures without immediate physical damage observable to the naked eye.

Improvements in thermal management of the EEC in the gas turbine engine are therefore needed in the art.

SUMMARY OF THE DISCLOSED EMBODIMENTS

In one aspect, a gas turbine engine is provided that includes a fan configured to generate a fanstream and a fanstream duct configured to receive the fanstream flowing therethrough. An engine electronic component is positioned in flow communication with the fanstream. A heating element is positioned in the fanstream upstream from the engine electronic component and is operative to heat at least a portion of the fanstream in flow communication with the engine electronic component. The position of the engine electronic component passively thermally conditions the engine electronic component and the heating element actively thermally conditions the engine electronic component.

In a further embodiment of the above, the position of the engine electronic component mitigates a temperature of the engine electronic component.

In a further embodiment of any of the above, the position of the engine electronic component at least one of normalizes or reduces temperature swings of the engine electronic component.

In a further embodiment of any of the above, the gas turbine engine also includes a thermal management unit operative to control a temperature of the heating element.

In a further embodiment of any of the above, the engine electronic component includes insulation operative to slow down thermal transients imposed on the engine electronic component.

In a further embodiment of any of the above, the engine electronic component includes radiative shielding to control a temperature of the engine electronic component.

In a further embodiment of any of the above, the gas turbine engine also includes a low pressure compressor, wherein the engine electronic component is positioned on the low pressure compressor.

In a further embodiment of any of the above, the engine electronic component is positioned at an inner diameter of the fanstream duct.

In a further embodiment of any of the above, the engine electronic component is positioned at an outer diameter of the fanstream duct.

In one aspect, a gas turbine engine is provided having a fanstream duct with a fanstream flowing therethrough. An engine electronic component is positioned in flow communication with the fanstream. A thermal management unit is provided. A heating element is positioned in the fanstream upstream from the engine electronic component and operative to heat at least a portion of the fanstream in flow communication with the engine electronic component. A temperature of the heating element is controlled by the thermal management unit. The position of the engine electronic component passively thermally conditions the engine electronic component and the heating element actively thermally conditions the engine electronic component.

In a further embodiment of the above, the position of the engine electronic component mitigates a temperature of the engine electronic component.

In a further embodiment of any of the above, the position of the engine electronic component at least one of normalizes or reduces temperature swings of the engine electronic component.

In a further embodiment of any of the above, the engine electronic component includes insulation operative to slow down thermal transients imposed on the engine electronic component.

In a further embodiment of any of the above, the engine electronic component includes radiative shielding to control a temperature of the engine electronic component.

In a further embodiment of any of the above, the engine electronic component is positioned at an inner diameter of the fanstream duct.

In a further embodiment of any of the above, the engine electronic component is positioned at an outer diameter of the fanstream duct.

In one aspect, a method of controlling a temperature of an engine electronic component within a gas turbine engine including a fanstream duct having a fanstream flowing therethrough is provided. The method includes controlling a temperature of the heating element to heat at least a portion of the fanstream to provide active cooling to the engine electronic component.

In a further embodiment of the above, the method includes thermally conditioning the electronic component with passive cooling of the engine electronic component by the fanstream.

In a further embodiment of any of the above, the method includes positioning the engine electronic component to normalize temperature cycles of the engine electronic component.

In a further embodiment of any of the above, the method includes insulating the engine electronic component to control a temperature of the engine electronic component.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
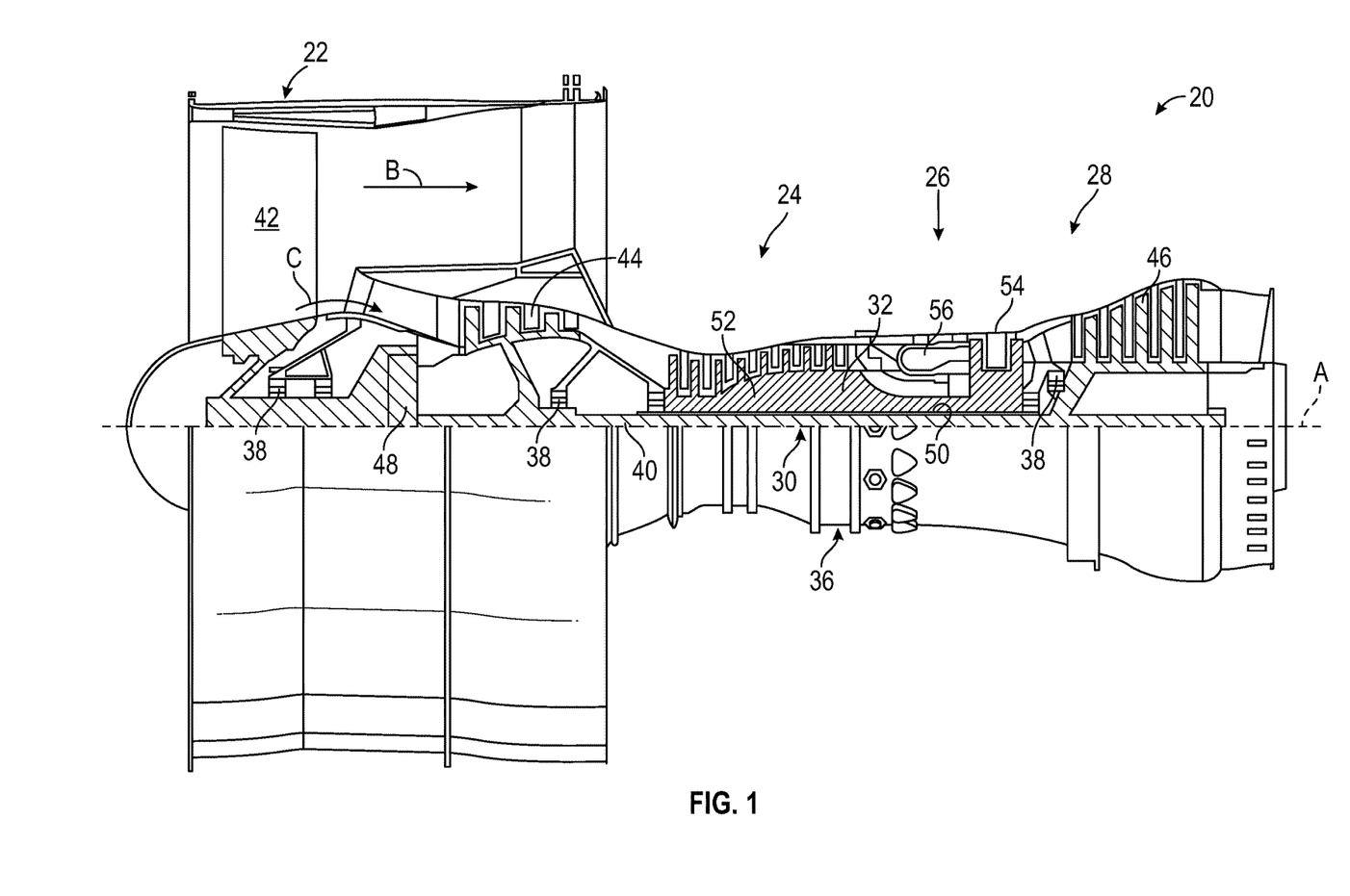
FIG. 1 is a sectional view of a gas turbine engine in an embodiment.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In addition, one of ordinary skill in the art would understand that the various embodiments may be applicable to other non-geared turbine engines, or even other engines that experience variations in temperature, including, without limitation, automobiles, non-turbine airplane engines, etc.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
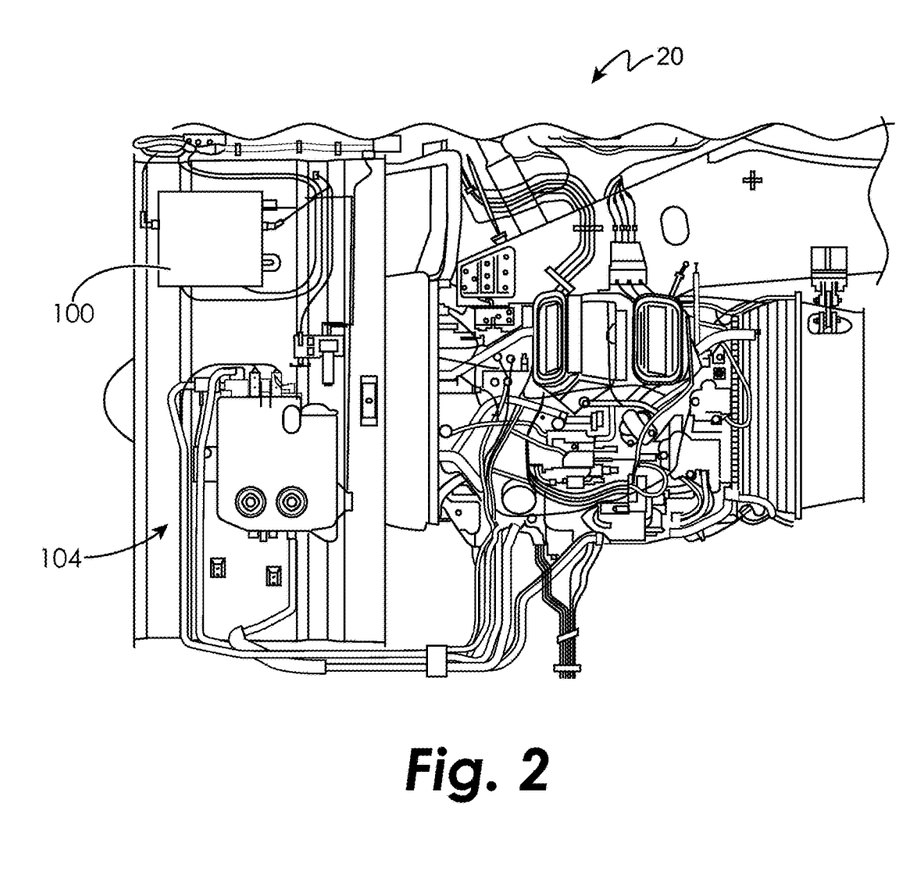
FIG. 2 is an elevational view of a gas turbine engine having an engine electronic component.

FIG. 2 illustrates positioning of an engine electronic component 100 in the gas turbine engine 20. In the engine 20, the EEC 100 is secured to a side of the fan casing 104 of the fan section 22. When positioned on the side of the fan casing 104, the EEC may experience radically changing temperatures, for example temperatures in a range of approximately −65° F. to approximately 190° F. during a single flight cycle. This can cause temperature cycles between extreme cold ambient air temperatures and high temperatures caused by ambient conditions coupled with internal heating effects, thereby creating stress on the internal components and solder joints of the EEC 100. Additionally, extreme hot ambient air temperatures over extended periods can degrade the EEC 100 and eventually cause a loss of wire bonding in integrated circuits causing the integrated circuits to malfunction at extreme high or low temperatures. Other degradation and damage to the EEC 100 can also be caused by such temperature extremes.

Figure 3:
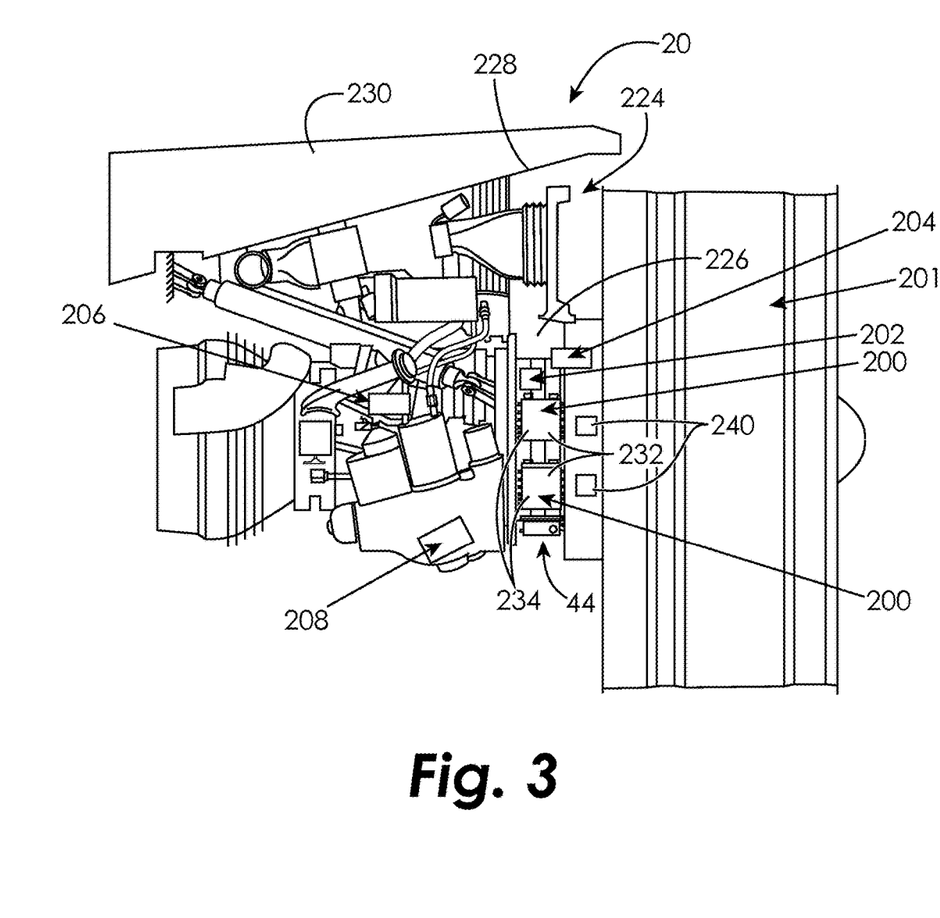
FIG. 3 is a sectional view of a gas turbine engine having an engine electronic component in accordance with an embodiment.
Figure 4:
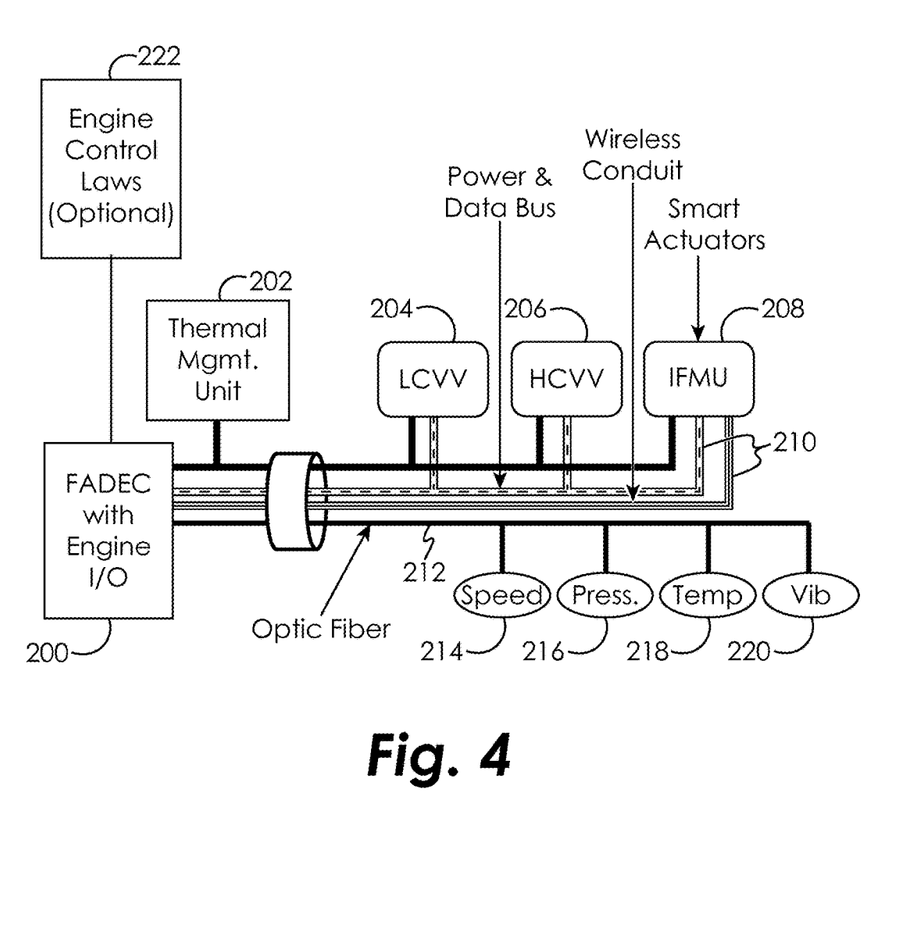
FIG. 4 is a schematic view of an engine electronic system component layout.

Referring to FIG. 3, the engine 20 includes an engine electronic component (EEC) 200, for example a diagnostic, prognostic and health monitor, or a full authority digital engine control (FADEC), to name some non-limiting examples, that is not mounted to the fan casing 201. In one embodiment, the term "EEC" may also refer to a thermal management unit, a low compressor variable vane control, a high compressor variable vane control, or an integrated fuel management unit. In the illustrated embodiment, the EEC 200 controls various fuel, hydraulic or pneumatic systems of the engine 20. In an embodiment, the EEC 200 controls a thermal management unit 202, a low compressor variable vane control 204, a high compressor variable vane control 206, and an integrated fuel management unit 208, to name just some non-limiting examples. As illustrated in FIG. 4, the EEC 200 may comprise a full authority digital engine control that receives signals from the low compressor variable vane control 204, high compressor variable vane control 206, and integrated fuel management unit 208, such as through a power and data bus 210, or optic fiber 212, to name just some non-limiting examples. In an embodiment, the optic fiber 212 connects the EEC 200 to various sensors, for example a speed sensor 214, a pressure sensor 216, a temperature sensor 218, and a vibration sensor 220. The speed sensor 214, pressure sensor 216, temperature sensor 218, and vibration sensor 220 may be located at various locations throughout the engine 20. In an embodiment, the speed sensor 214, pressure sensor 216, temperature sensor 218, and vibration sensor 220 provide feedback from the engine 20 to the EEC 200. The EEC 200 may utilize this feedback to control at least one of the thermal management unit 202, low compressor variable vane control 204, high compressor variable vane control 206, and integrated fuel management unit 208. In one embodiment, an engine control laws unit 222 may also be electronically coupled to the EEC 200 to dictate control of the engine 20 through the EEC 200. In one embodiment, an engine control laws unit may be contained in the EEC 200.

Figure 5:
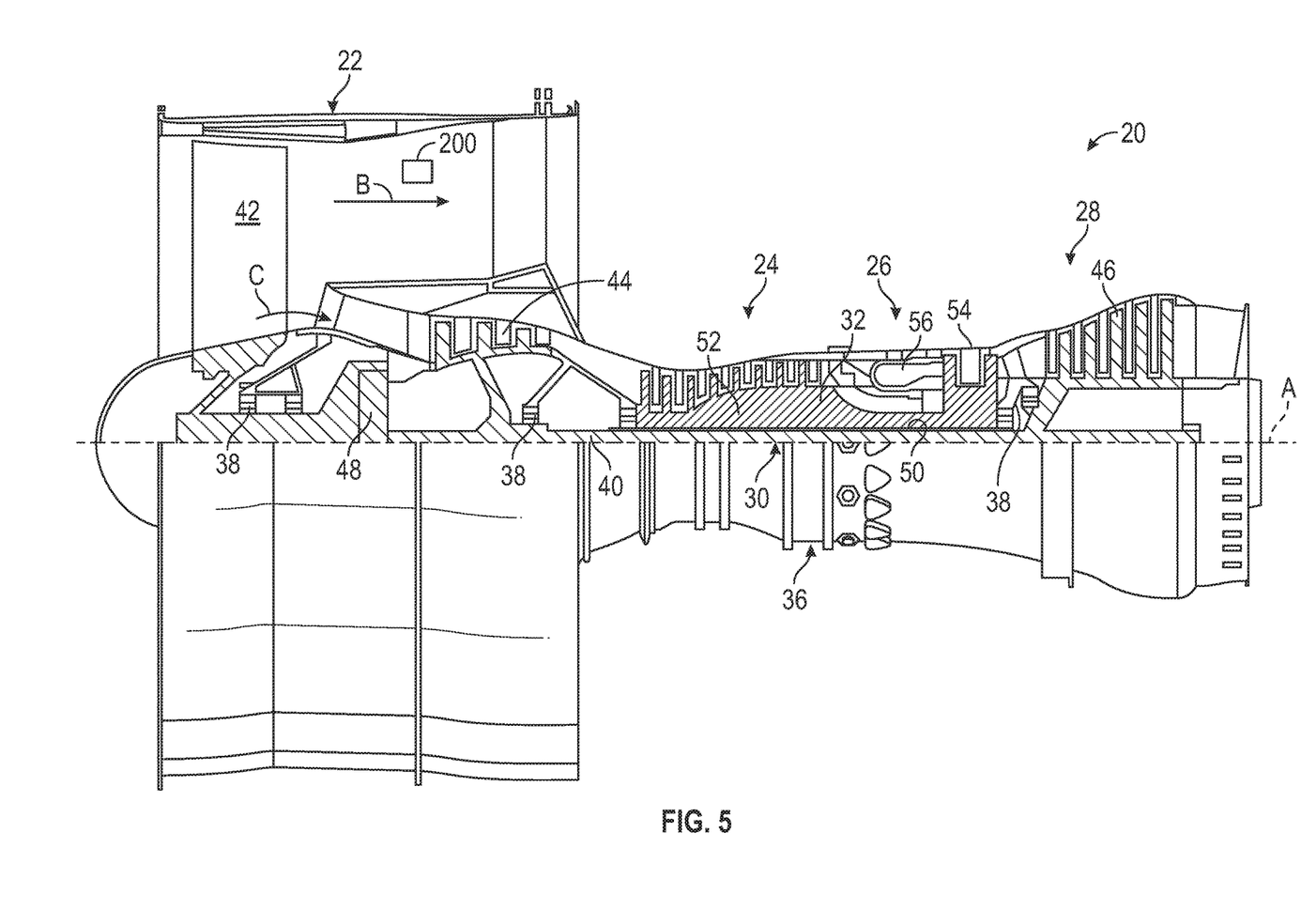
FIG. 5 is a sectional view of a gas turbine engine having an engine electronic component in accordance with an embodiment.
Figure 6:
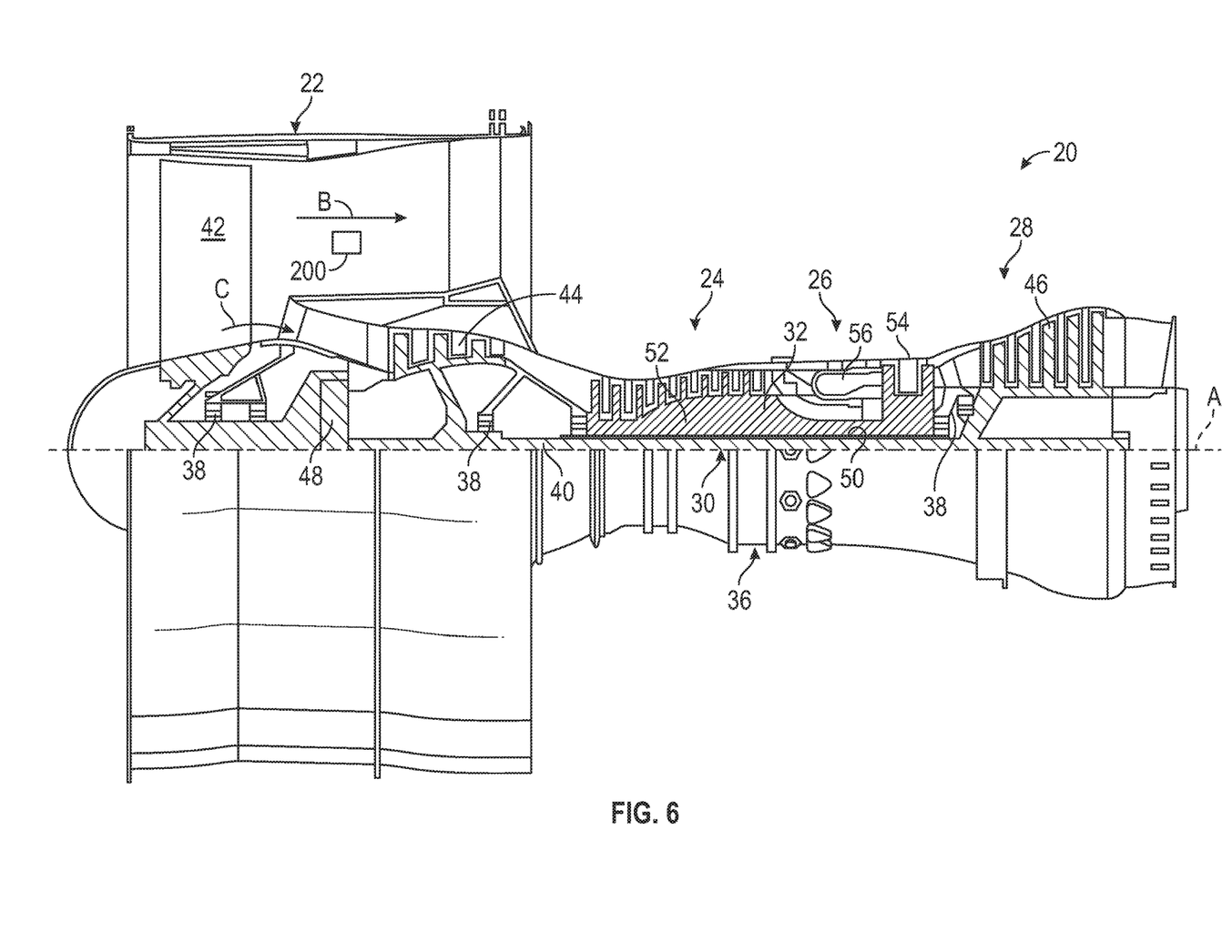
FIG. 6 is a sectional view of a gas turbine engine having an engine electronic component in accordance with an embodiment.
Figure 7:
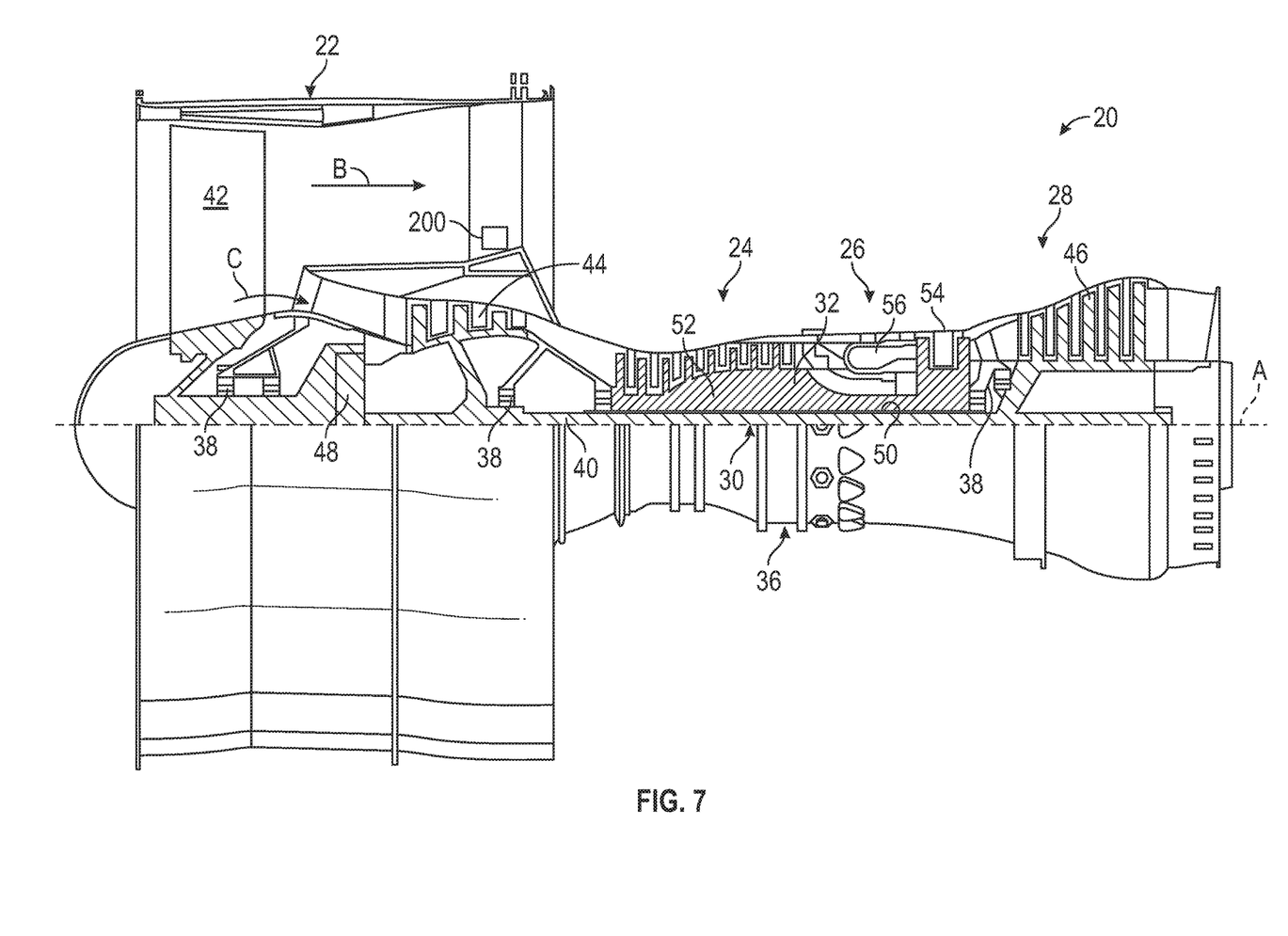
FIG. 7 is a sectional view of a gas turbine engine having an engine electronic component in accordance with an embodiment.
Figure 8:
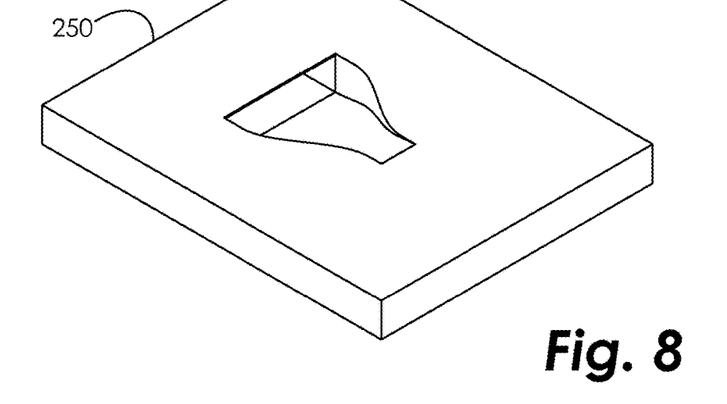
FIG. 8 a is perspective view of a flush wall in accordance with an embodiment.
Figure 9:
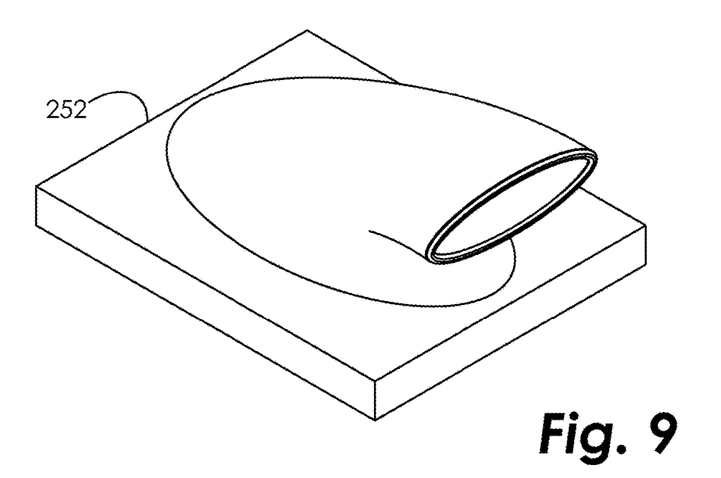
FIG. 9 is a perspective view of a ram scoop in accordance with an embodiment.

Referring once again to FIG. 3, the EEC 200 is positioned adjacent a low-pressure compressor 44 of the engine 20. The EEC 200 includes a front portion 232 and a rear portion 234. In such an embodiment, the EEC 200 is not mounted on the fan casing 201. In an embodiment, the EEC 200 is positioned within a fanstream duct 224 having fanstream flowing therethrough. The fanstream is in flow communication with an external surface of the low-pressure compressor 44. In the illustrated embodiment, the EEC is positioned at an inner diameter 226 of the fanstream duct 224 on a side of the low-pressure compressor 44. In the embodiment shown in FIG. 5, the EEC 200 is positioned at an outer diameter 228 of the fanstream duct 224 on the nacelle 230. In the embodiment shown in FIG. 6, the EEC 200 may be positioned in the midstream of the fanstream duct 224. In the embodiment shown in FIG. 7, the EEC 200 may be located on an aft half of the fanstream duct 224, such that a portion of the fanstream enters the front portion 232 of the EEC 200 at a location in the fanstream where a moderate airflow exists, while this portion of the fanstream exits the rear portion 234 of the EEC 200 in or near a fan nozzle exit plane where the airflow is higher. In an embodiment, this location provides a working pressure gradient that may allow the fanstream flow to pass through and over the EEC 200 providing needed ventilation to dissipate the internal heat generation of the EEC 200. In an embodiment, a fanstream inlet to the EEC 200 may take the form of a flush wall inlet, as illustrated in FIG. 8, or a ram scoop, as illustrated in FIG. 9, depending on the amount of thermal conditioning desired. In an embodiment, the EEC 200 may be located in any location where fanstream airflow may be used to moderate the temperature of the EEC.

In an embodiment, the EEC 200 may be fully insulated to prevent unwanted heat transfer from occurring. In one embodiment, the EEC 200 may include a radiative shielding. As shown in the embodiment of FIG. 3, the EEC 200 may also incorporate a heater 240 to warm at least a portion of the fanstream air that will flow through and over the EEC 200 when the fanstream air temperature is below a predetermined limit. The heater 240 limits a minimum temperature seen by the EEC 200. In an embodiment the heater 240 may be controlled by feedback from the thermal management unit 202. Accordingly, some embodiments provide environmental conditioning using both passive and active thermal conditioning of the EEC 200. Passive thermal conditioning is provided by relocating the EEC 200 within the fanstream. Active thermal conditioning is facilitated by the heater 240. On takeoff of the aircraft, the fanstream provides passive thermal conditioning through the fanstream duct 224. As the aircraft reaches cruise elevation, the ambient air temperatures may drop to as low as approximately −65° F. In such a scenario, the heater 240 provides active thermal conditioning of the EEC 200 by warming at least a portion of the fanstream to a temperature that is above ambient but still cooler than the EEC 200.

In an embodiment, the position of the EEC 200 within the fanstream mitigates a temperature of the EEC 200 and reduces the excursion magnitude of a temperature cycle of the EEC 200 during flight. The present embodiments provide improved EEC 200 component durability compared to EEC units without environmental conditioning. The improved durability is facilitated through a reduced thermal excursion magnitude. Additionally, the present embodiments facilitate improving EEC 200 component durability compared to EEC units located in alternate off-fan-case regions, such as the core nacelle. Additionally, the present embodiments are also directly applicable to any turbo fan engine.

Some of the present embodiments may reduce interconnect and wiring costs, weight, and size. Specifically, in one embodiment, analog signals from the sensors are converted to digital signals. Accordingly, rather than utilizing multiple wires to send analog signals from the sensors, a data bus with a limited number of wires may be utilized to send digital signals. Additionally, the physical placement of the EEC 200 reduces to amount of wiring required. Some of the present embodiments may also provide thermal robustness through thermal conditioning of the electronics. Some of the present embodiments may also enable the use of multiplexed inputs and outputs with standardized FADEC interfaces, thereby reducing non-recurring design costs. Moreover, some of the present embodiments may enable distributed and networked nodes, multiplexed optic sensors, and local/protected wireless embedded sensing.

While the disclosure has been illustrated and described in detail in the drawings and foregoing description, the same is to be considered as illustrative and not restrictive in character, it being understood that only certain embodiments have been shown and described and that all changes and modifications that come within the scope of the disclosure are desired to be protected.

What is claimed is:

1. A gas turbine engine comprising:
   a fan configured to generate a fanstream;
   a fanstream duct configured to receive the fanstream flowing therethrough;
   an engine electronic component positioned in flow communication with the fanstream; and
   a heating element positioned in the fanstream upstream from the engine electronic component and operative to heat at least a portion of the fanstream in flow communication with the engine electronic component, wherein the position of the engine electronic component passively thermally conditions the engine electronic component and the heating element actively thermally conditions the engine electronic component.

2. The gas turbine engine of claim 1, wherein the position of the engine electronic component mitigates a temperature of the engine electronic component.

3. The gas turbine engine of claim 1, wherein the position of the engine electronic component at least one of normalizes or reduces temperature swings of the engine electronic component.

4. The gas turbine engine of claim 1 further comprising a thermal management unit operative to control a temperature of the heating element.

5. The gas turbine engine of claim 1, wherein the engine electronic component further comprises insulation operative to slow down thermal transients imposed on the engine electronic component.

6. The gas turbine engine of claim 1, wherein the engine electronic component further comprises radiative shielding to control a temperature of the engine electronic component.

7. The gas turbine engine of claim 1 further comprising a low pressure compressor, wherein the engine electronic component is positioned on the low pressure compressor.

8. The gas turbine engine of claim 1, wherein the engine electronic component is positioned at an inner diameter of the fanstream duct.

9. The gas turbine engine of claim 1, wherein the engine electronic component is positioned at an outer diameter of the fanstream duct.

10. A gas turbine engine comprising:
    a fanstream duct having a fanstream flowing therethrough;
    an engine electronic component positioned in flow communication with the fanstream;
    a thermal management unit; and
    a heating element positioned in the fanstream upstream from the engine electronic component and operative to heat at least a portion of the fanstream in flow communication with the engine electronic component, wherein a temperature of the heating element is controlled by the thermal management unit, and wherein the position of the engine electronic component passively thermally conditions the engine electronic component and the heating element actively thermally conditions the engine electronic component.

11. The gas turbine engine of claim 10, wherein the position of the engine electronic component mitigates a temperature of the engine electronic component.

12. The gas turbine engine of claim 10, wherein the position of the engine electronic component at least one of normalizes or reduces temperature swings of the engine electronic component.

13. The gas turbine engine of claim 10, wherein the engine electronic component further comprises insulation operative to slow down thermal transients imposed on the engine electronic component.

14. The gas turbine engine of claim 10, wherein the engine electronic component further comprises radiative shielding to control a temperature of the engine electronic component.

15. The gas turbine engine of claim 10, wherein the engine electronic component is positioned at an inner diameter of the fanstream duct.

16. The gas turbine engine of claim 10, wherein the engine electronic component is positioned at an outer diameter of the fanstream duct.

17. A method of controlling a temperature of an engine electronic component within a gas turbine engine including a fanstream duct having a fanstream flowing therethrough, the method comprising: controlling a temperature of a heating element to heat at least a portion of a fanstream to provide active thermal conditioning to an engine electronic component.

18. The method of claim 17 further comprising thermally conditioning the electronic component with passive cooling of the engine electronic component by the fanstream.

19. The method of claim 17 further comprising positioning the engine electronic component to normalize temperature cycles of the engine electronic component.

20. The method of claim 17 further comprising insulating the engine electronic component to control a temperature of the engine electronic component.

\* \* \* \* \*